(12) United States Patent
Bizjak et al.

(10) Patent No.: US 9,461,536 B2
(45) Date of Patent: Oct. 4, 2016

(54) DIGITAL CONTROLLER WITH NESTED LOOPS FOR SWITCHED MODE POWER CONVERTER

(71) Applicant: Infineon Technologies Austria AG, Villach (AT)

(72) Inventors: Luca Bizjak, Villach (AT); Stefano Marsili, Faak am See (AT); Roman Riederer, Villach (AT); Stylianos Perissakis, Villach (AT)

(73) Assignee: Infineon Technologies Austria AG, Villach (AT)

( * ) Notice: Subject to any disclaimer, the term of this patent is extended or adjusted under 35 U.S.C. 154(b) by 266 days.

(21) Appl. No.: 14/092,590

(22) Filed: Nov. 27, 2013

(65) Prior Publication Data

US 2015/0145486 A1    May 28, 2015

(51) Int. Cl.
| | |
|---|---|
| G05F 1/30 | (2006.01) |
| H02M 3/04 | (2006.01) |
| H02M 3/156 | (2006.01) |
| H02J 7/04 | (2006.01) |

(52) U.S. Cl.
CPC ............... *H02M 3/04* (2013.01); *H02J 7/045* (2013.01); *H02J 7/047* (2013.01); *H02M 3/156* (2013.01)

(58) Field of Classification Search
CPC ........................................................ G05F 1/30
USPC ................................ 323/234, 265–289, 351
See application file for complete search history.

(56) References Cited

U.S. PATENT DOCUMENTS

| | | | |
|---|---|---|---|
| 5,844,399 A | 12/1998 | Stuart | |
| 6,169,669 B1 | 1/2001 | Choudhury | |
| 6,784,648 B2 * | 8/2004 | Mitamura | H02M 3/157 323/282 |
| 7,449,869 B2 | 11/2008 | Markowski | |
| 7,902,803 B2 | 3/2011 | Peng et al. | |
| 7,982,445 B1 * | 7/2011 | Xin-Leblanc | H02M 3/158 323/282 |

(Continued)

FOREIGN PATENT DOCUMENTS

| | | |
|---|---|---|
| CN | 1588270 A | 3/2005 |
| CN | 102437760 A | 5/2012 |
| EP | 2365620 A1 | 9/2011 |

OTHER PUBLICATIONS

Office Action, in the Chinese language, from counterpart Chinese Application No. 201410697768.9, dated Jun. 28, 2016, 11 pp.

*Primary Examiner* — Adolf Berhane
*Assistant Examiner* — Nusrat Quddus
(74) *Attorney, Agent, or Firm* — Shumaker & Sieffert, P.A.

(57) ABSTRACT

In one example, a method includes receiving a voltage value and comparing the voltage value to a reference voltage value to determine a delta voltage value. The method may also include determining a reference current value based on the delta voltage value. The method may also include receiving a current value and comparing the current value to the reference current value to determine a delta current value. The method may also include determining a threshold value based on the delta current value, where the threshold value is used to define a control signal that controls a power converter.

23 Claims, 8 Drawing Sheets

(56) References Cited

U.S. PATENT DOCUMENTS

| | | | | |
|---|---|---|---|---|
| 2004/0070382 A1* | 4/2004 | Walters | H02J 1/102 | 323/284 |
| 2005/0231181 A1* | 10/2005 | Bernacchia | H02M 3/156 | 323/274 |
| 2006/0043954 A1 | 3/2006 | Markowski | | |
| 2008/0164859 A1 | 7/2008 | Peng et al. | | |
| 2011/0115453 A1* | 5/2011 | Marsili | H02M 3/1582 | 323/282 |
| 2011/0210707 A1* | 9/2011 | Marsili | H03K 7/08 | 323/271 |
| 2012/0081093 A1* | 4/2012 | Hidaka | H02M 3/156 | 323/283 |
| 2013/0038311 A1* | 2/2013 | Sawarkar | H02M 3/156 | 323/288 |
| 2013/0043852 A1* | 2/2013 | Marsili | H02M 3/157 | 323/283 |
| 2013/0127430 A1* | 5/2013 | Leung | H02M 3/157 | 323/282 |
| 2013/0285627 A1* | 10/2013 | Chae | G05F 1/46 | 323/271 |
| 2014/0217996 A1* | 8/2014 | Peker | H02M 3/1582 | 323/271 |

* cited by examiner

DIGITAL CONTROLLER WITH NESTED LOOPS FOR SWITCHED MODE POWER CONVERTER

TECHNICAL FIELD

The invention relates to controllers for electrical power converters, and in particular, to digital controllers for switched mode electrical power converters.

BACKGROUND

Power converters, including switched mode power converters, may be used as drivers for loads with specific current and/or voltage requirements, such as batteries. During operation of a switched mode power converter, one or more switches are used to control the output power. Generally, some form of controller is used to control the operation of these switches. When designing a controller for a switched mode power converter, it is generally desirable to maximize the efficiency of the power converter.

SUMMARY

In general, the techniques described in this disclosure are related to using the voltage across a load coupled to the output of a power converter (e.g., a battery) to determine the reference current for a current control loop that controls the power converter. For example, a controller may determine a reference current value based on the voltage across a battery coupled to the output of a power converter and a reference voltage value. The controller may then determine a threshold value based on the reference current value and the current being supplied to the battery. In some examples, the controller may then output a control signal to the power converter based on the threshold value.

In one example, a method includes receiving a voltage value, comparing the voltage value to a reference voltage value to determine a delta voltage value, determining a reference current value based on the delta voltage value, receiving a current value, comparing the current value to the reference current value to determine a delta current value, and determining a threshold value based on the delta current value, wherein the threshold value is used to define a control signal that controls a power converter.

In another example, a circuit includes a first analog to digital converter configured to convert an analog voltage into a digital voltage value, a first subtractor configured to subtract a reference voltage from the digital voltage value to determine a delta voltage value, an integrator configured to integrate the delta voltage value to determine a reference current value, a second analog to digital converter configured to convert an analog current sample received from the power converter into a digital current value, a second subtractor configured to subtract the reference current value from the digital current value to determine a delta current value, a controller configured to determine a threshold value based on the delta current value, and a digital pulse width modulator configured to output, to the power converter, a control signal based on the threshold value.

In another example, a device includes means for receiving a voltage value, means for comparing the voltage value to a reference voltage value to determine a delta voltage value, means for determining a reference current value based on the delta voltage value, means for receiving a current value, means for comparing the current value to the reference current value to determine a delta current value, and means for determining a threshold value based on the delta current value, wherein the threshold value is used to define a control signal that controls a power converter.

The details of one or more embodiments of the invention are set forth in the accompanying drawings and the description below. Other features, objects, and advantages of the invention will be apparent from the description and drawings, and from the claims.

DETAILED DESCRIPTION

A switched mode power converter (SMPC) is an electronic power supply that includes one or more switches to convert and transfer electrical power from a power source to a load. Some examples of SMPCs include buck, boost, buck-boost, flyback, and Cuk. Power conversion is achieved by adjusting the duty cycle of a control signal used to control the state of the switches. The higher the duty cycle of the control signal, the more power is transferred to the load. Typically, the control signal is generated by either an analog or digital controller.

In some examples, the load attached to a SMPC may include one or more batteries. In such examples, the SMPC may charge the batteries. Typically, the amount of power supplied to a battery is not constant throughout the charging process. To accommodate the requirements of battery charging, some SMPC controllers utilize two separate charging phases each being controlled by a separate loop. These phases are typically referred to as a constant current phase and a constant voltage phase. The voltage control loop determines its duty cycle based on the difference between a battery voltage and a reference voltage. The current control loop determines its duty cycle based on the difference between a battery charging current and a predetermined reference current. Each of the control loops outputs a duty cycle and the lesser of the two duty cycles is used to determine the control signal that drives the SMPC. The two separate control loops run throughout the entire charging process, even when the SMPC is not operating in the corresponding charging phase (e.g., the voltage control loop is active during the constant current phase).

In accordance with techniques of this disclosure, a digital controller may utilize the voltage measured across a load coupled to the output of a power converter to determine the reference current for a current control loop that controls the power converter. Various aspects of this disclosure may provide one or more advantages. For example, the techniques of this disclosure may eliminate the need to implement two separate control loops. Additionally, the techniques of this disclosure may provide for more efficient power transfer and reduced power losses.

Figure 1:
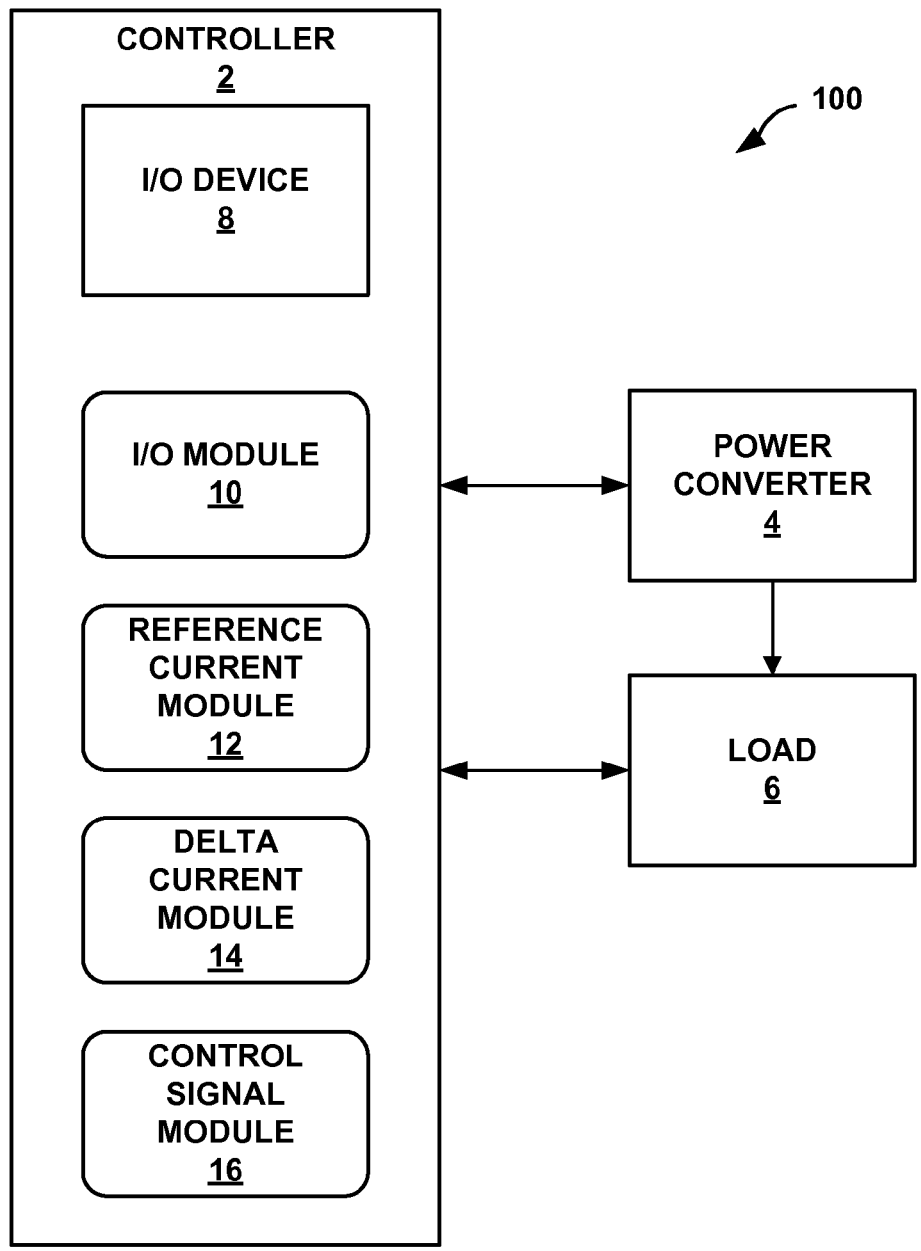
FIG. 1 is a conceptual diagram illustrating an example system for controlling a switched mode power converter, in accordance with one or more techniques of this disclosure.

FIG. 1 is a conceptual diagram illustrating an example system 100 for controlling a switched mode power converter in accordance with one or more techniques of this disclosure. System 100 includes controller 2, power converter 4, and load 6. Examples of controller 2 may include but are not limited to one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components.

As illustrated in FIG. 1, controller 2 may include I/O device 8. In some examples, I/O device 8 is configured to receive one or more input signals and/or generate one or more output signals. Examples of I/O device 8, as shown in FIG. 1, may include one or more analog to digital converters, one or more digital pulse width modulation (DPWM) generators, one or more general purpose input/outputs (GPIO), or more bus interfaces (e.g., I2C, UART, SPI, LIN, IrDa, and/or CAN), and/or any other type of device configured to receiving input or generating output. I/O device 8 may receive signals from other components of system 100, such as power converter 4 and/or load 6. Additionally, I/O device 8 may output signals to other components of system 100, such as power converter 4 and/or load 6.

Controller 2, in some examples, includes I/O module 10. I/O module 10 may perform one or more functions to receive input, such as electrical signals, and send such input to other components associated with controller 2, such as reference current module 12 and delta current module 14. I/O module 10 may also receive data from components associated with controller 2, such as control signal module 16. Using the data, I/O module 10 may cause other components associated with controller 2, such as I/O device 8, to provide output based on the data. For instance, I/O module 10 may receive data from control signal module 16 that causes I/O device 8 to output a control signal to power converter 4.

Controller 2, in some examples, includes reference current module 12. Reference current module 12 may include functionality to perform any variety of operations on controller 2. For instance, reference current module 12 may receive data, such as a voltage value, from other components of controller 2, such as I/O module 10. Reference current module 12 may also include functionality to process the received data and send the result to other components of controller 2, such as delta current module 14. For instance, reference current module 12 may process a voltage value received from I/O module 10 to determine a reference current value. Reference current module 12 may then send the determined reference current value to delta current module 14

Controller 2, in some examples, includes delta current module 14. Delta current module 14 may include functionality to perform any variety of operations on controller 2. For instance delta current module 14 may receive data, such as a reference current value or a current value, from other components of controller 2, such as reference current module 12 or I/O module 10. Delta current module 14 may also include functionality to process the received data and send the result to other components of controller 2, such as control signal module 16. For instance, delta current module 14 may process a reference current value received from reference current module 12 and a current value received from I/O module 10 to determine a delta current value. Delta current module 14 may then send the determined delta current value to control signal module 16.

Controller 2, in some examples, includes control signal module 16. Control signal module 16 may include functionality to perform any variety of operations on controller 2. For instance, control signal module 16 may receive data, such as a delta current value, from other components of controller 2, such as delta current module 14. Control signal module 16 may also include functionality to process the received data and send the result to other components of controller 2, such as I/O module 10. For instance, control signal module may process a delta current value received from delta current module 14 to determine a threshold value. Control signal module 16 may then send the determined threshold value to I/O module 10. I/O module 10 may then cause I/O device 8 to generate output based on the threshold value.

System 100 may include power converter 4. As shown in FIG. 1, power converter 4 may be coupled to other components of system 100, such as controller 2 and load 6. In some examples, power converter 4 is configured to receive input, such as a control signal, from other components of system 100, such as controller 2. Power converter 4 may be configured to provide output, such as electrical power, to other components of system 100, such as load 6. In some examples, power converter 4 is configured to provide output to other components of system 100 in response to input received from other components of system 100. For instance, power converter 4 may provide power to load 6 in response to a control signal received from controller 2. In some examples, power converter 4 may be configured to send signals, such as voltage or current signals (either analog or digital), to other components of system 100. For instance, power converter 4 may be configured to send a voltage sample and/or a current sample to controller 2. Examples of power converter 4 include switched mode power converters such as buck, boost, buck-boost, flyback, Cuk, or any other type device that can provide electrical power.

System 100 may include load 6. As shown in FIG. 1, load 6 may be coupled to other components of system 100, including power converter 4 and controller 2. In some examples, load 6 may include one or more batteries, one or more computing devices, any other device that uses electrical power, or any combination of the same. Where load 6 includes a battery, the battery may include a plurality of cells. Load 6 may be configured to receive input, such as electrical power, from other components of system 100, such as power converter 4. Additionally, load 6 may be configured to provide output to other components of system 100. For instance, load 6 may be configured to provide voltage samples (either analog or digital) to controller 2. Examples of load 6 may include computers (e.g., tablet or laptop computers), mobile computing devices (e.g., "smartphones," and personal digital assistants), batteries (e.g., nickel-cadmium, lead-acid, nickel-metal hydride, nickel-zinc, silver-oxide, lithium-ion, or any other type of rechargeable battery), or any combination of the same.

Techniques of this disclosure may improve the efficiency and optimization of controllers of switched mode power converters. Using techniques of the disclosure, a controller of a switched mode power converter may, instead of implementing two separate control loops to define a control signal, utilize at least two nested control loops to define the control signal for a power converter. The controller can implement the current control loop inside the voltage control loop such that the voltage loop defines the reference current used by the current control loop. In other words, the voltage control loop may be referred to as an outer loop and the current control loop may be referred to as an inner loop.

In the example of FIG. 1, I/O module 10 may receive data from I/O device 8 that corresponds to a voltage sample received from load 6. In other examples, the voltage sample may be received from power converter 4. The voltage sample may correspond to a voltage across load 6. In some examples, the received voltage sample is an analog voltage sample. In such cases, I/O device 8 and/or I/O module 10 may include an analog to digital converter which may convert the analog voltage sample into a digital voltage value. In other examples, the received voltage sample may already include a digital voltage value. In either case, I/O module 10 may send the voltage value to reference current module 12.

Reference current module 12 may receive the voltage value. Reference current module 12 may compare the received voltage value to a reference voltage value to determine a delta voltage value. For instance, reference current module 12 may determine the delta voltage value by subtracting the reference voltage value from the received voltage value. As an example, if the received voltage value is 8 volts and the reference voltage value is 12 volts, reference current module 12 may determine that the delta voltage value is 4 volts. In some examples, reference current module 12 may further process the determined delta voltage value. For instance, reference current module 12 may invert the determined delta voltage value. To continue with the previous example where the received voltage value is 8 volts and the reference voltage value is 12, delta current module 12 may determine the delta voltage value to be negative 4 volts. Additionally, reference current module 12 may apply a non-linear gain to the determined delta voltage value. For instance, reference current module 12 may apply a first gain level to the delta voltage value where the delta voltage value is greater than a threshold value and apply a second gain level to the delta voltage value where the delta voltage value is less than the threshold value. In some examples, the threshold value may be zero. In some examples, reference current module 12 may apply a plurality of gain levels corresponding to a plurality of threshold values. For instance, reference current module 12 may apply a first gain level to the delta voltage value where the delta voltage value is greater than a first threshold value, apply a second gain level to the delta voltage value where the delta voltage value is between the first threshold value and a second threshold value, and apply a third gain level to the delta voltage value where the delta voltage value is less than the second threshold value. In some examples, the first gain level may be greater than the second gain level. In some examples, the first gain level and/or the second gain level may be digitally reprogrammable. In some examples, reference current module 12 may apply the first gain level to the delta voltage value where the delta voltage value is greater than a first value. In such examples, the first value may be digitally reprogrammable.

In any case, reference current module 12 may then determine a reference current value based on the delta voltage value. For instance, reference current module 12 may integrate the delta voltage value to determine the reference current value. In some examples, reference current module 12 may restrict the determined reference current value such that the reference current value is greater than a minimum value and lesser than a maximum value. In some examples, the minimum value may be an end of charge current level and the maximum value may be a maximum current at which a battery electrically coupled to an output of the power converter can be charged. In any case, reference current module 12 may send the determined reference current value to delta current module 14.

Delta current module 14 may receive the reference current value. Additionally, delta current module 14 may receive a current value from I/O module 10. For instance, I/O module 10 may receive data from I/O device 8 that corresponds to a current sample received from load 6. In other examples, the current sample may be received from power converter 4. The current sample may correspond to a current flowing to load 6. In some examples, the received current sample is an analog current sample. In such cases, I/O device 8 and/or I/O module 10 may include an analog to digital converter which may convert the analog current sample into a digital current value. In other examples, the received current sample may already include a digital current value. In either case, I/O module 10 may send the current value to delta current module 14.

Delta current module 14 may compare the received current value to the received reference current value to determine a delta current value. For instance, delta current module 14 may determine the delta current value by subtracting the reference current value received from reference current module 12 from the current value received from I/O module 10. Delta current module 14 may send the determined delta current value to control signal module 16.

Control signal module 16 may receive the delta current value. Control signal module 16 may determine a threshold value based on the received delta current value. For instance, control signal module 16 may determine the threshold value based on the delta current value with a proportional-integral (PI) controller. In some examples, control signal module 16 may send a signal to I/O module 10 that causes I/O device 8 to output a control signal based on the determined threshold value. In such examples, the control signal may be provided to power converter 4 to cause power converter 4 to supply power to load 6. In this way, controller 2 utilizes two nested control loops to define the control signal for a power converter. As such, the techniques may improve the efficiency and optimization of controllers of switched mode power converters.

Figure 2:
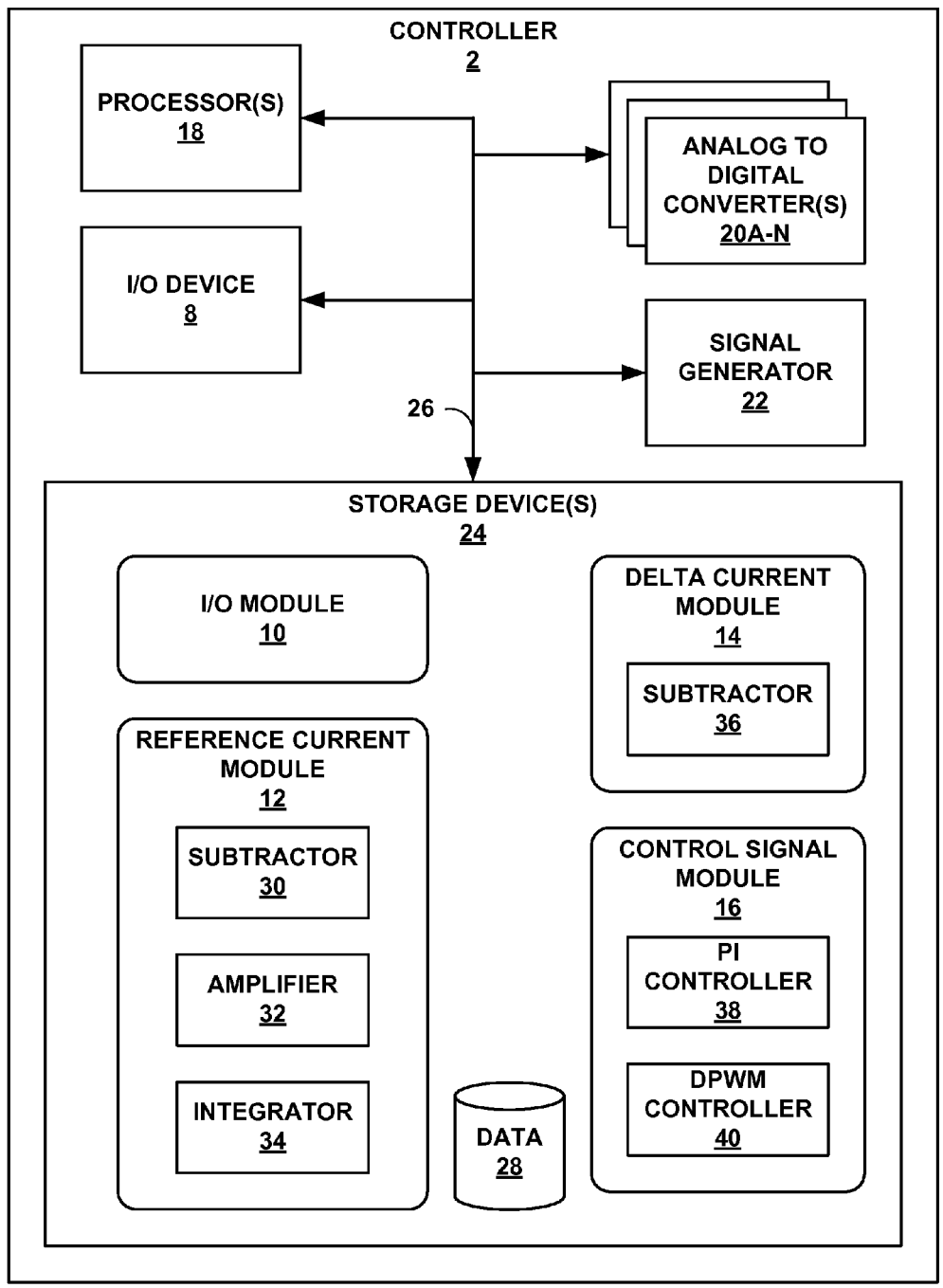
FIG. 2 is a block diagram illustrating details of an example controller that controls a switched mode power converter, in accordance with one or more techniques of this disclosure.

FIG. 2 is a block diagram illustrating details of an example controller that controls a switched mode power converter in accordance with one or more techniques of this disclosure. FIG. 2 illustrates one example of controller 2, and may other examples of controller 2 may be implemented.

As shown in the specific example of FIG. 2, controller 2 may include one or processor(s) 18, one or more analog to digital converters 20A-N, I/O device 8, signal generator 22, and one or more storage device(s) 24. Each of components 18, 20A-N, 8, 22, and 24 may be interconnected (physically, communicatively, and/or operatively) via communication channels 26 for inter-component communications. In some examples, communication channels 26 may include a system bus, network connection, interprocess communication data structure, or any other channel for communicating data. One or more of storage devices 24, in some examples, may include I/O module 10, reference current module 12, delta current module 14, control signal module 16, and data 28. I/O module 10, reference current module 12, delta current module 14, and control signal module 16 may communicate information with one another as well as with other components in controller 2, such as data 28.

Processors 18, in one example, are configured to implement functionality and/or process instructions for execution within controller 2. For example, processors 18 may be capable of processing instructions stored in one or more of storage devices 24. Examples of processors 18 may include any one or more microprocessors, digital signal processors (DSPs), application specific integrated circuits (ASICs), field programmable gate arrays (FPGAs), or any other equivalent integrated or discrete logic circuitry, as well as any combinations of such components.

One or more storage devices 24 may be configured to store information within controller 2 during operation. One or more of storage devices 24, in some examples, may comprise a computer-readable storage medium. In some examples, one or more of storage devices 24 may comprise a temporary memory, meaning that a primary purpose of storage devices 24 is not long-term storage. One or more of storage devices 24, in some examples, may comprise a volatile memory, meaning that one or more of storage devices 24 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 24 is used to store program instructions for execution by processors 18. One or more of storage devices 24, in one example, may be used by software or modules running on controller 2 (e.g., modules 10, 12, 14, and 16) to temporarily store information during program execution.

One or more of storage devices 24, in some examples, may also include one or more computer-readable storage media. One or more of storage devices 24 may be configured to store larger amounts of information that volatile memory. One or more of storage devices 24 may further be configured for long-term storage of information. In some examples, one or more of storage devices 24 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Controller 2, in some examples, also includes one or more analog to digital converters (ADC) 20A-N (collectively ADC 20). ADC 20 is configured to convert a received analog signal into a digital value. Examples of ADC 20 include a direct conversion ADC, a flash ADC, a successive-approximation ADC, a ramp-compare ADC, a Wilkinson, integrating ADC, a delta-encoded ADC, a pipeline ADC, a sigma-delta ADC, a time-interleaved ADC, or another device capable of converting an analog signal into a digital signal.

Controller 2, in some examples, also includes signal generator 22. Signal generator 22, in some examples, may be configured to generate and output a signal. For instance, signal generator 22 may be configured to output a PWM signal. In some examples, signal generator 22 may be a specially configured output of controller 2. In other examples, signal generator 22 may be a GPIO output of controller 2.

Reference current module 12, as illustrated in FIG. 2, includes subtractor 30, amplifier 32, and integrator 34. Subtractor 30 may be configured to subtract a first value from a second value to determine a third value. For instance, subtractor 30 may subtract a reference voltage value from a digital voltage value to determine a delta voltage value. Amplifier 32 may be configured to amplify a value to determine an amplified value. In some examples, amplifier 32 may amplify a value by applying a non-linear gain. For instance, amplifier 32 may apply a non-linear gain to a delta voltage value to determine an amplified delta voltage value. Integrator 34 may be configured to integrate a value to determine an integrated value. For instance, integrator 34 may integrate a delta voltage value to determine a reference current value.

Delta current module 14, as illustrated in FIG. 2, includes subtractor 36. Subtractor 36 may be configured to subtract a first value from a second value to determine a third value. For instance, subtractor 36 may be converted to subtract a reference current value from a digital current value to determine a delta current value.

In some examples, one or more of storage devices 24 may include data 28. Data 28, in some examples, is configured to store settings for use by other components of controller 2, such as modules 10, 12, 14, and 16.

In accordance with techniques of the disclosure ADC 20 may receive an analog voltage sample from a power converter and convert the analog voltage sample into a digital voltage value. I/O module 10 may then receive the digital voltage value from ADC 20 and provide the same to subtractor 30 of reference current module 12.

Subtractor 30 may receive the digital voltage value. In some examples, subtractor 30 may receive a reference voltage value from data 28. Subtractor 30 may then subtract the digital voltage value from the reference voltage value to determine a delta voltage value. In some examples, subtractor 30 may then send the determined delta voltage value to amplifier 32.

Amplifier 32 may receive the delta voltage value. In some examples, amplifier 32 may invert the received delta voltage value to determine an amplified delta voltage value. In some examples, amplifier 32 may apply a non-linear gain to the received delta voltage value to determine the amplified delta voltage value. For instance, amplifier 32 may apply a non-linear gain to the received delta voltage value by applying a first gain level to the delta voltage value if the delta voltage value is greater than the voltage second threshold value and applying a second gain level to the delta voltage value if the delta voltage value is less than the second threshold value. In some examples, the first gain level may be greater than the second gain level. In some examples, the second threshold value may be zero. In either case, amplifier 32 may send the amplified delta voltage value to integrator 34.

Integrator 34 may receive the amplified delta voltage value. In some examples, integrator 34 may integrate the received amplified delta voltage value to determine a reference current value. In some examples, integrator 34 may store one or more previous amplified delta voltage values in data 28. In some examples, integrator 34 may use the one or more stored previous amplified delta voltage values to integrate the amplified delta voltage value. In some examples, integrator 34 is a clamped integrator that restricts the determined reference current value to between a maximum value and a minimum value. In some examples, the minimum value may be an end of charge current level and the maximum value may be maximum current at which a battery electrically coupled to an output of a power converter can be charged. In any case, integrator 34 may send the determined reference current value to subtractor 36 of delta current module 14.

ADC 20 may receive an analog current sample from a power converter and convert the analog current sample into a digital current value. I/O module 10 may then receive the digital current value from ADC 20 and provide the same to subtractor 36 of delta current module 14.

Subtractor 36 of delta current module 14 may receive the reference current value and the digital current value. In some examples, subtractor 36 may subtract the reference current value from the digital current value to determine a delta current value. Subtractor 36 may send the determined delta current value to PI controller 38 of control signal module 16.

PI controller 38 of control signal module 16 may receive the delta current value. In some examples PI controller 38 may determine a threshold value based on the delta current value. In some examples, PI controller 38 may implement a feedback loop that uses a proportional term and an integral term to determine the threshold value. PI controller 38 may send the determined threshold value to digital pulse width modulation (DPWM) controller 40.

DPWM 40 may receive the threshold value. In some examples, DPWM controller 40 may define a PWM signal based on the received threshold value. In some examples, DPWM controller 40 may send data corresponding to the defined PWM signal to signal generator 22 that causes signal generator 22 to output a PWM signal to a power converter operably coupled to controller 2.

In some examples, the digital voltage value may correspond to a voltage across a load electrically coupled to an output of a power converter. In some examples, the current value may correspond to a current flowing through a load. In some examples, a load may include a battery. In such examples, the battery may include a plurality of cells. In some examples, ADC 20 may be configured to convert a plurality of analog voltage samples received from a power converter into a plurality of digital voltage values. In some examples, a plurality of voltage values may respectively correspond to voltages across a plurality of cells of a battery. In some examples, controller 2 further includes a selector configured to select a cell voltage value from a plurality of digital voltage values. In such examples, subtractor 30 may be configured to subtract a reference voltage from the selected cell voltage value to determine a delta voltage value.

In some examples, controller 2 further includes components that define an input current loop and/or a temperature loop. In some examples, the components of controller 2 that define the input current loop may include a subtractor configured to subtract a reference input current from an input current value received from a power converter to determine a delta input current value, an integrator configured to integrate the delta input current value to determine a first intermediate value. In some examples, the components of controller 2 that define the temperature loop may include a subtractor configured to subtract a reference temperature from a temperature value received from a power converter to determine a delta temperature value, and an integrator configured to integrate the delta temperature value to determine a second intermediate value. In either case, integrator 34 may be a clamped integrator configured to determine a reference current value between a maximum value and minimum value. In some examples, the maximum value may be based on one or both of the first intermediate value and the second intermediate value.

Figure 3:
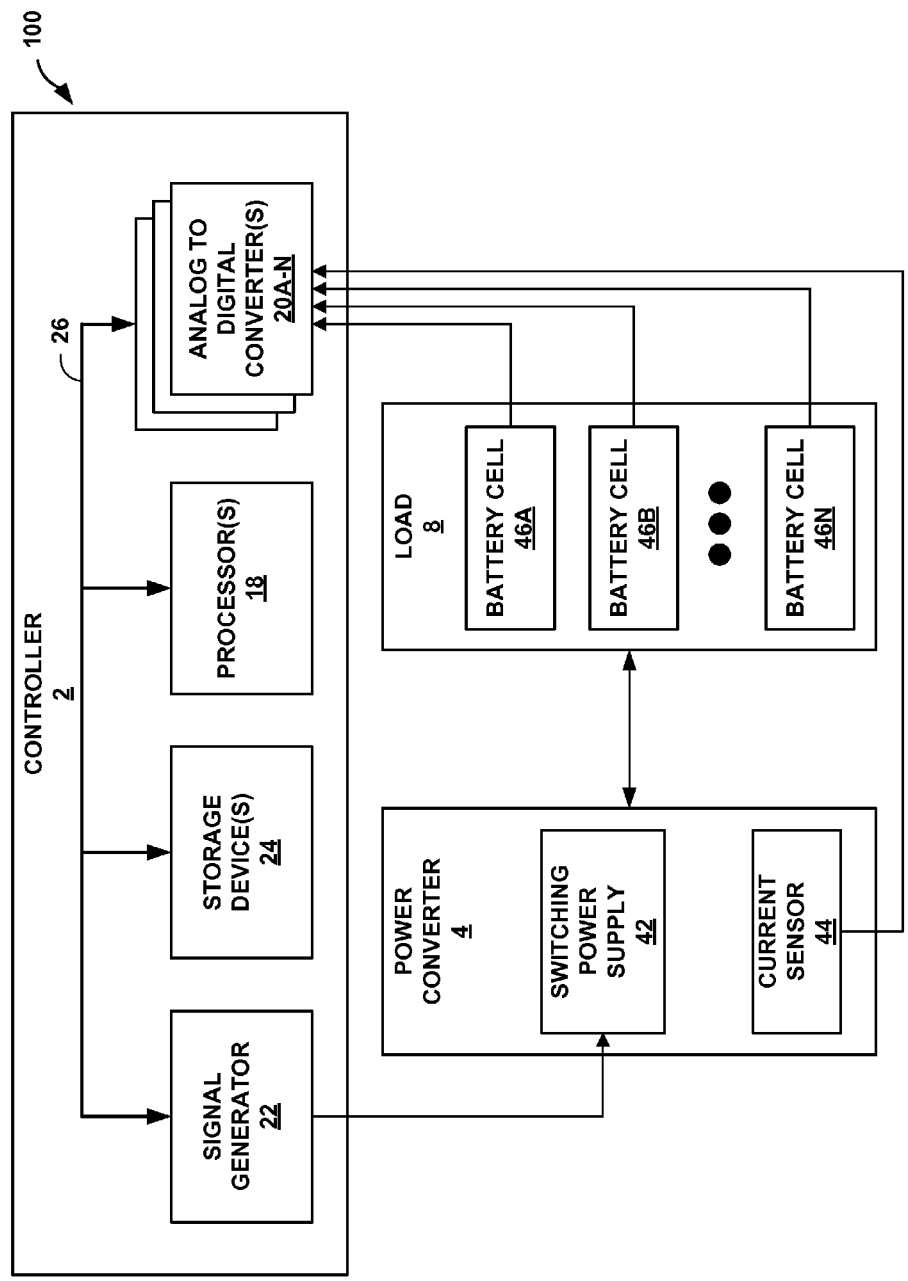
FIG. 3 is a block diagram illustrating details of an example system for controlling a switched mode power converter, in accordance with one or more techniques of this disclosure.

FIG. 3 is a conceptual diagram illustrating details of an example system 100 for controlling a switched mode power converter in accordance with one or more techniques of this disclosure. As illustrated in FIG. 3, system 100 may include controller 2, power converter 4, and load 6.

In the example of FIG. 3, power converter 4 includes switching power supply 42 and current sensor 44. Switching power supply 42 is configured to supply power to load 8 in response to receiving a control signal. Current sensor 44 is configured to output a signal corresponding to the current flowing to load 8 to controller 2. In some examples, current sensor 44 includes a sense resistor and the voltage levels on either side of the sense resistor are provided to controller 2, along with the value of the sense resistor, such that the current flowing through the sense resistor can be determined. In some examples, current sensor 44 may be configured to output a signal corresponding to the current flowing into power converter 4 to controller 2.

In the example of FIG. 3, load 8 includes battery cells 46A-N. As discussed above, battery cells 46A-N may include any type of rechargeable battery. Battery cells 46A-N may form a single battery, or a group of batteries. In the example of FIG. 3, battery cells 46A-N are configured to supply controller 2 with signals corresponding to the voltage across each cell. Additionally, in some example, load 8 and/or battery cells 46A-N may be configured to provide additional information to controller 2, such as temperature.

In accordance with techniques of this disclosure, controller 2 may receive a plurality of voltage values from load 8. For instance, ADC 20A-N may receive a plurality of voltage samples respectively corresponding to the voltages across battery cells 46A-N. In some examples, system 100 may further include a multiplexer and associated control logic such that only a single ADC 20A is used to receive the plurality of voltage samples. In some examples, the voltage samples may include analog voltage samples. In such examples, ADC 20A-N may convert the received analog voltage samples into digital voltage values. In either case, controller 2 may select the greatest voltage value from the plurality of voltage values.

In some examples, controller 2 may then process the selected voltage value as described above. For example controller 2 may compare the voltage value to a reference voltage value to determine a delta voltage value, determine a reference current value based on the delta voltage value, receive a current value, compare the current value to the reference current value to determine a delta current value, and determine a threshold value based on the delta current value, wherein the threshold value is used to define a control signal that controls a power converter.

In some examples, controller 2 may include an input current loop, a temperature loop, and/or a state of charge control loop. In some examples, controller 2 may receive additional data from load 8. For instance, controller 2 may receive one or more temperature readings from load 8 that correspond to the current temperature of one or more of battery cells 46A-N. In such examples, controller 2 may compare the received temperature to a reference temperature to determine a delta temperature. In some examples, the reference temperature may correspond to a maximum operating temperature of one or more of battery cells 46A-N. In some examples, controller 2 may determine a first reference value based on the delta temperature. For instance, controller 2 may apply a non-linear gain and/or integrate the delta temperature value to determine the first reference value. As discussed above, when determining the reference current value, controller 2 may restrict the determined reference current value such that the reference current value is greater than a minimum value and lesser than a maximum value. In some examples, controller 2 may use the first reference value in place of the reference voltage value when determining the delta voltage value. In this way, the temperature loop may be a second nesting loop. In some examples, controller 2 may determine the maximum value for the reference current based on the first reference value. In this way, the safety of system 100 is increased because the amount of power supplied by power converter 4 will decrease where the battery exceeds its maximum operating temperature.

In some examples, controller 2 may receive additional data from power converter 4. For instance, controller 2 may receive an input current value from power converter 4 that corresponds to the current flowing into power converter 4. In such examples, controller 2 may compare the received input current value to a reference input current value to determine a delta input current value. Additionally, in such examples, controller 2 may determine a second reference value based on the delta input current value. For instance, controller 2 may apply a non-linear gain and/or integrate the delta input current value to determine the second reference value. In some examples, controller 2 may use the second reference value in place of the reference voltage value when determining the delta voltage value. In this way, the input current loop may be a second nesting loop. In some examples, controller 2 may determine the maximum value for the reference current based on the second reference value. In this way, additional control is provided because it becomes possible to restrict the amount of current used by power converter 4.

Figure 4:
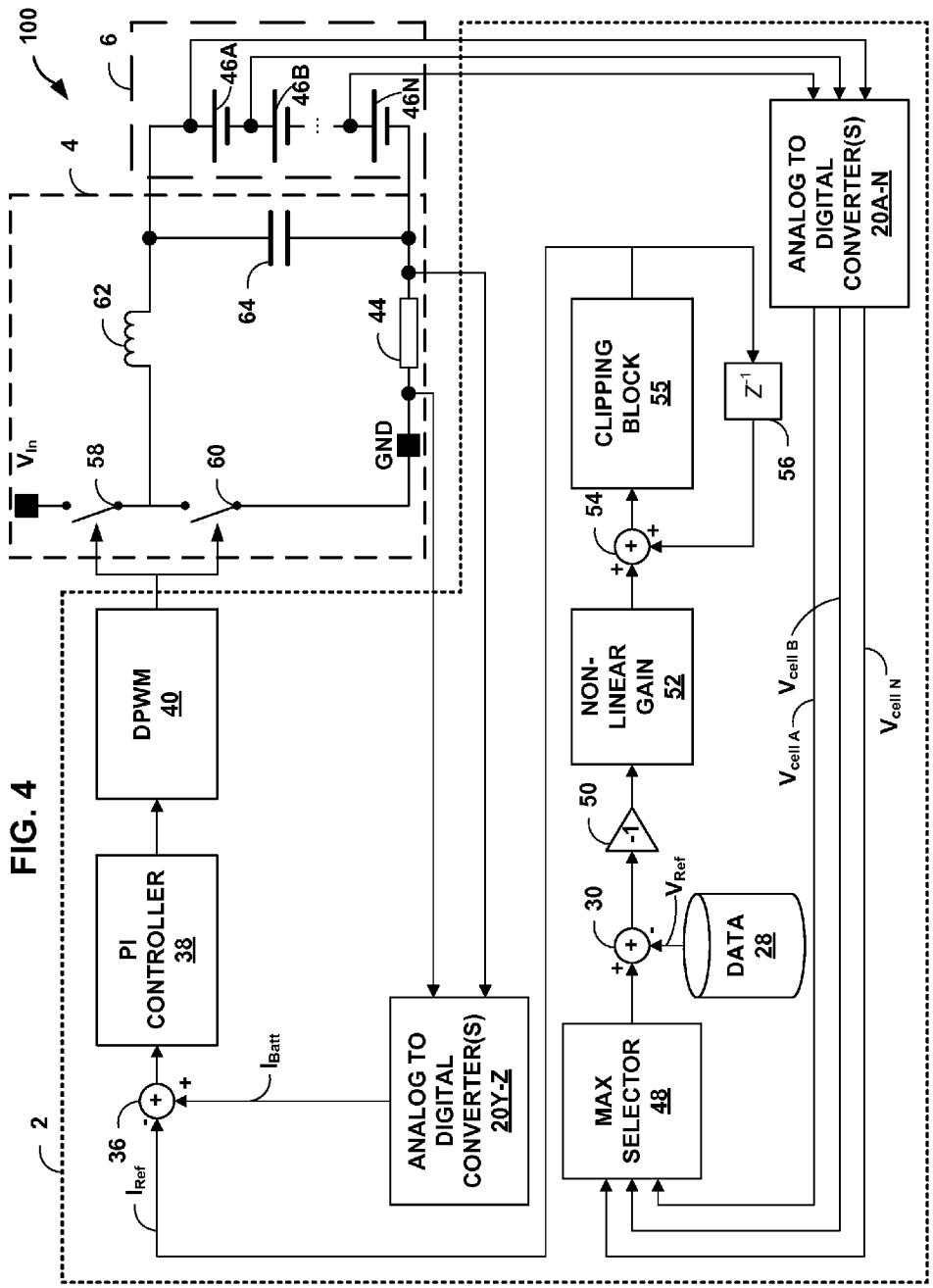
FIG. 4 is a block diagram illustrating details of an example system for controlling a switched mode power converter, in accordance with one or more techniques of this disclosure

FIG. 4 is a block diagram illustrating details of an example system for controlling a switched mode power converter in accordance with one or more techniques of this disclosure. As illustrated in FIG. 4, system 100 may include controller 2, power converter 4, and load 6.

In the example of FIG. 4, controller 2 includes analog to digital converters 20A-N, analog to digital converters 20Y-Z, max selector 48, data 28, subtractor 30, inverter 50, non-linear gain 52, adder 54, clipping block 55, delay 56, subtractor 36, PI controller 38, and DPWM 40. In some examples, analog to digital converters 20Y-Z are configured to convert an analog current sample received from power converter 4 into a digital current sample. In some examples, max selector 48 is configured to receive a plurality of voltage values, analyze the plurality of voltage values to determine the greatest voltage value, and output the greatest voltage value. In some examples, inverter 50 is configured to receive a value, invert the value, and output a resulting inverted value. In some examples, non-linear gain 52 is configured to receive a value, apply a non-linear gain to the value to determine a resulting value, and output the resulting value. In some examples, adder 54 is configured to receive a first value and a second value, add the first value to the second value to determine a combined value, and output the combined value. In some examples, delay 56 is configured to receive a value from a first time sample, store the value, and output the stored value during a second, later, time sample. The functionality of analog to digital converters 20A-N, data 28, subtractor 30, subtractor 36, PI controller 38, and DPWM 40 is described above with reference to FIGS. 1-3.

In the example of FIG. 4, power converter 4 includes high side switch 58, low side switch 60, inductor 62, capacitor 64, and current sensor 44. In some examples, high side switch 58 and low side switch 60 are configured to receive one or more control signals, and either permit or prevent the flow or current in response to the one or more control signals. In some examples, high side switch 58, low side switch 60, inductor 62, and capacitor 64 may form a switched mode power converter as discussed above. The functionality of current sensor 44 is described above with reference to FIGS. 1-3.

In the example of FIG. 4, load 6 includes battery cells 46A-N (collectively "battery cells 46"). The functionality of battery cells 46A-N is described above with reference to FIGS. 1-3.

In accordance with techniques of this disclosure, controller 2 may receive a plurality of voltage values from load 8. For instance, ADC 20A-N may receive a plurality of analog voltage samples respectively corresponding to the voltages across battery cells 46A-N. In some examples, ADC 20A-N may convert the received plurality of analog voltage samples into a plurality of digital voltage values. In some examples, ADC 20A-N may send the plurality of digital voltage values to max selector 48.

Max selector 48 may receive the plurality of digital voltage values. In some examples, max selector 48 may select a voltage value from the plurality of digital voltage values. In some examples, the selected voltage value may be the greatest voltage value. Max selector 48 may send the selected voltage value to subtractor 30.

Subtractor 30 may receive the digital voltage value. In some examples, subtractor 30 may receive a reference voltage value from data 28. Subtractor 30 may then subtract the digital voltage value from the reference voltage value to determine a delta voltage value. In some examples, subtractor 30 may then send the determined delta voltage value to inverter 50.

Inverter 50 may receive the delta voltage value. In some examples, inverter 50 may invert the delta voltage value to determine an inverted delta voltage value. For instance, inverter 50 may multiply the delta voltage value by negative one to determine the inverted delta voltage value. In some examples, inverter 50 may then send the inverted delta voltage value to non-linear gain 52.

Non-linear gain 52 may receive the inverted delta voltage value. In some examples, non-linear gain 52 may apply a non-linear gain to the received delta voltage value by applying a first gain level to the delta voltage value if the delta voltage value is greater than voltage second threshold value and applying a second gain level to the delta voltage value if the delta voltage value is less than the second threshold value. In some examples, the first gain level may be greater than the second gain level. In either case, non-linear gain 52 may send the amplified delta voltage value to adder 54.

Adder 54 may receive the amplified delta voltage value. In some examples, adder 54 may receive a previous reference current value from delay 56. In some examples, adder 54 may then add the amplified delta voltage value to the previous reference current value to determine an intermediate value. In some examples, adder 54 may send the intermediate value to clipping block 55.

Clipping block 55 may receive the intermediate value. In some examples, clipping block 55 may determine a reference current value based on the intermediate value. In some examples, clipping block 55 may determine the reference current value by restricting the intermediate value between a maximum value and a minimum value. In some examples, the minimum value is an end of charge current level. In some examples, the maximum value may be a maximum current at which battery cells 46 may be charged.

ADC 20Y-Z may receive an analog current sample from a power converter and convert the analog current sample into a digital current value. In some examples, ADC 20Y-Z may receive two voltage samples from power converter 4. In such examples, a difference between the two voltage samples may correspond to the voltage across current sensor 44. For instance, ADC 20Y-Z may divide the difference between the two voltage samples by a resistance value of a sense resistor included in current sensor 44 to determine the digital current value. In some examples, ADC 20Y-Z may send the digital current value to subtractor 36.

The functionality and operations of subtractor 36, and PI controller 38 are fully described above with respect to FIGS. 1-3.

As discussed above, DPWM 40 may receive the threshold value from PI controller 38. In some examples, DPWM 40 may output a signal to high side switch 58 that causes high side switch 58 to "close". For instance, DPWM 40 may output a signal to high side switch 58 that causes current to flow from $V_{In}$ to load 6 via inductor 62. In some examples, DPWM 40 may output a signal to high side switch 58 that causes high side switch 58 to "open". For instance DPWM 40 may output a signal to high side switch 58 that inhibits the flow current from $V_{In}$ to load 6 via inductor 62. In some examples, DPWM 40 may output a signal to low side switch 60 that causes low side switch 60 to "open". For instance, DPWM 40 may output a signal to low side switch 60 that inhibits the flow of current from inductor 62 to ground. In some examples, DPWM 40 may output a signal to low side switch 60 that causes low side switch 60 to "close". For instance, DPWM 40 may output a signal to low side switch 60 that causes current to flow from inductor 62 to ground.

Figure 5:
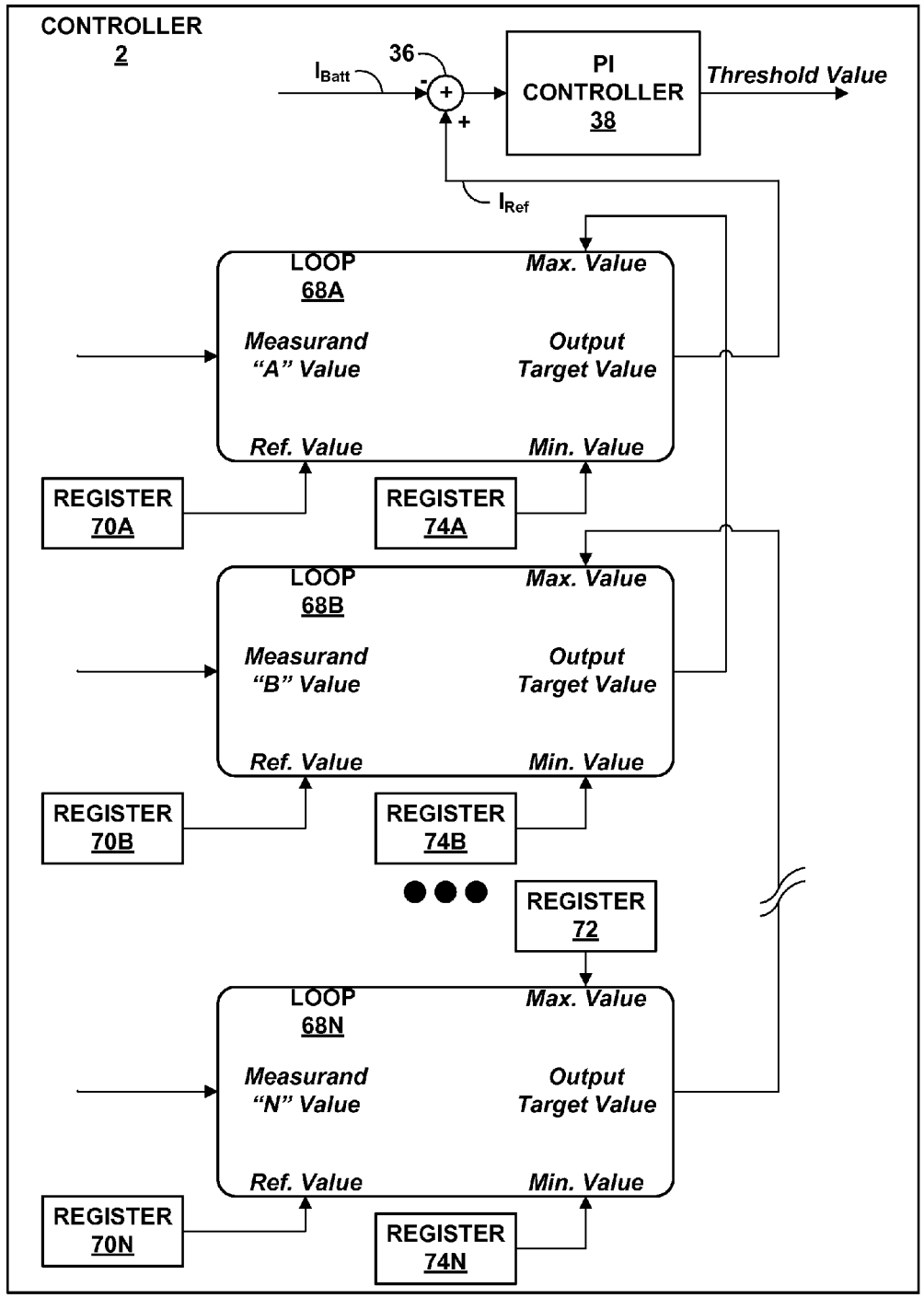
FIG. 5 is a block diagram illustrating details of an example controller that controls a switched mode power converter, in accordance with one or more techniques of this disclosure.

FIG. 5 is a block diagram illustrating details of an example controller that controls a switched mode power converter, in accordance with one or more techniques of this disclosure. As illustrated in the example of FIG. 5, controller 2 may include a plurality of nested loops 68A-N (collectively "nested loops 68"), a plurality of reference value registers 70A-70N (collectively "reference value registers 70"), maximum value register 72, a plurality of minimum value registers 74A-74N (collectively "minimum value registers 74"), subtractor 36, and PI controller 38. The functionality of subtractor 36, and PI controller 38 is described above with reference to FIG. 4.

Each of nested loops 68 may be associated with a measurand. Some example measurands include total battery voltage, battery cell voltage, a state of charge of a battery, and battery temperature. Each of nested loops 68 may be configured to determine an output target value based on one or more received values. In some examples, the one or more received values may include a measurand value, a reference value, a maximum value, and a minimum value. Each of nested loops 68 may be configured to determine their output target value between the received maximum value and the received minimum value. In some examples, each of nested loops 68 may include functionality similar to reference current module 12 of FIGS. 1 and 2 but in the context of different measurands. In some examples, such as where nested loop 68A is associated with the measurand of total battery voltage, nested loop 68A may include identical functionality to reference current module 12 of FIGS. 1 and 2.

Nested loops 68 may be arranged from outer to inner. For instance, nested loop 68B is an outer loop with reference to nested loop 68A and nested loop 68N is an outer loop with reference to nested loop 68B. In some examples, nested loops 68 may be arranged in a parallel configuration. For instance, the output of the outer most loop may be used as the maximum value for the next loop. As illustrated in the example of FIG. 5, the output target value determined by loop 68N may be the maximum value used by loop 68B, the next inner loop, when determining the output target value of loop 68B. Further, the output target value determined by loop 68B may be the maximum value used by loop 68A, the next inner loop, when determining the output target value of loop 68A.

Each of reference value registers 70 may be configured to store a reference value. In some examples, reference value registers 70 may be included within one or more storage devices, such as storage devices 24 of FIG. 2. Maximum value register 72 may be configured to store a maximum value. In some examples, maximum value register 72 may be included within one or more storage devices, such as storage devices 24 of FIG. 2. Each of minimum value registers 74 may be configured to store a minimum value. In some examples, minimum value registers 74 may all store the same minimum value. In some examples, minimum value registers 74 may each store a different minimum value. In some examples, the minimum value may be the minimum current at which a battery may be charged. For instance, where controller 2 is controlling a switched mode power converter that is charging a battery, the minimum value may be the minimum current at which the battery may be charged. In some examples, the minimum value may correspond to the current provided at the end of charge. In some examples, the values stored by minimum value registers 74 may depend on the configuration of loops 68 (e.g., parallel, series, or combination series/parallel). For instance, in the example of FIG. 5 where the loops 68 are in a parallel configuration, each of minimum value registers 74 may store the same value. Additionally, in some examples, the effect of the values stored by minimum value registers 74 may depend on the configuration of loops 68 (e.g., parallel, series, or combination series/parallel). For instance, where loop 68A is associated with battery voltage and loop 68B is associated with battery temperature, then the minimum clipping value for the temperature loop may have the effect of setting the minimum voltage level at which the battery will be charged. In some examples, minimum value registers 74 may be included within one or more storage devices, such as storage devices 24 of FIG. 2.

In accordance with one or more techniques of this disclosure, loop 68N may be associated with a first measurand and may receive a first measurand value from another component of system 100 (e.g., a power converter, such as power converter 4 of FIGS. 1, 3, and 4, or a load, such as load 6 of FIGS. 1, 3, and 4), a reference value from reference value register 70N, a minimum value from minimum value register 74N, and a maximum value from maximum value register 72. Based on the received values, loop 68N may determine an output target value and provide the determined value to the next inner loop. As illustrated in FIG. 5, the next inner loop is loop 68B.

Loop 68B may be associated with a second measurand and may receive a second measurand value from another component of system 100 (e.g., a power converter, such as power converter 4 of FIGS. 1, 3, and 4, or a load, such as load 6 of FIGS. 1, 3, and 4), a reference value from reference value register 70B, a minimum value from minimum value register 74B, and a maximum value from loop 68N (i.e., the maximum value of loop 68B is the determined output target value of loop 68N). Based on the received values, loop 68B may determine an output target value and provide the determined value to the next inner loop. As illustrated in FIG. 5, the next inner loop is loop 68A.

Loop 68A may be associated with a third measurand and may receive a third measurand value from another component of system 100 (e.g., a power converter, such as power converter 4 of FIGS. 1, 3, and 4, or a load, such as load 6 of FIGS. 1, 3, and 4), a reference value from reference value register 70A, a minimum value from minimum value register 74A, and a maximum value from loop 68B (i.e., the maximum value of loop 68A is the determined output target value of loop 68B). Based on the received values, loop 68A may determine an output target value and provide the determined value to the next inner loop. As illustrated in FIG. 5, the current control loop (i.e., the determined output target value of loop 68A is the reference current used by the current control loop).

Figure 6:
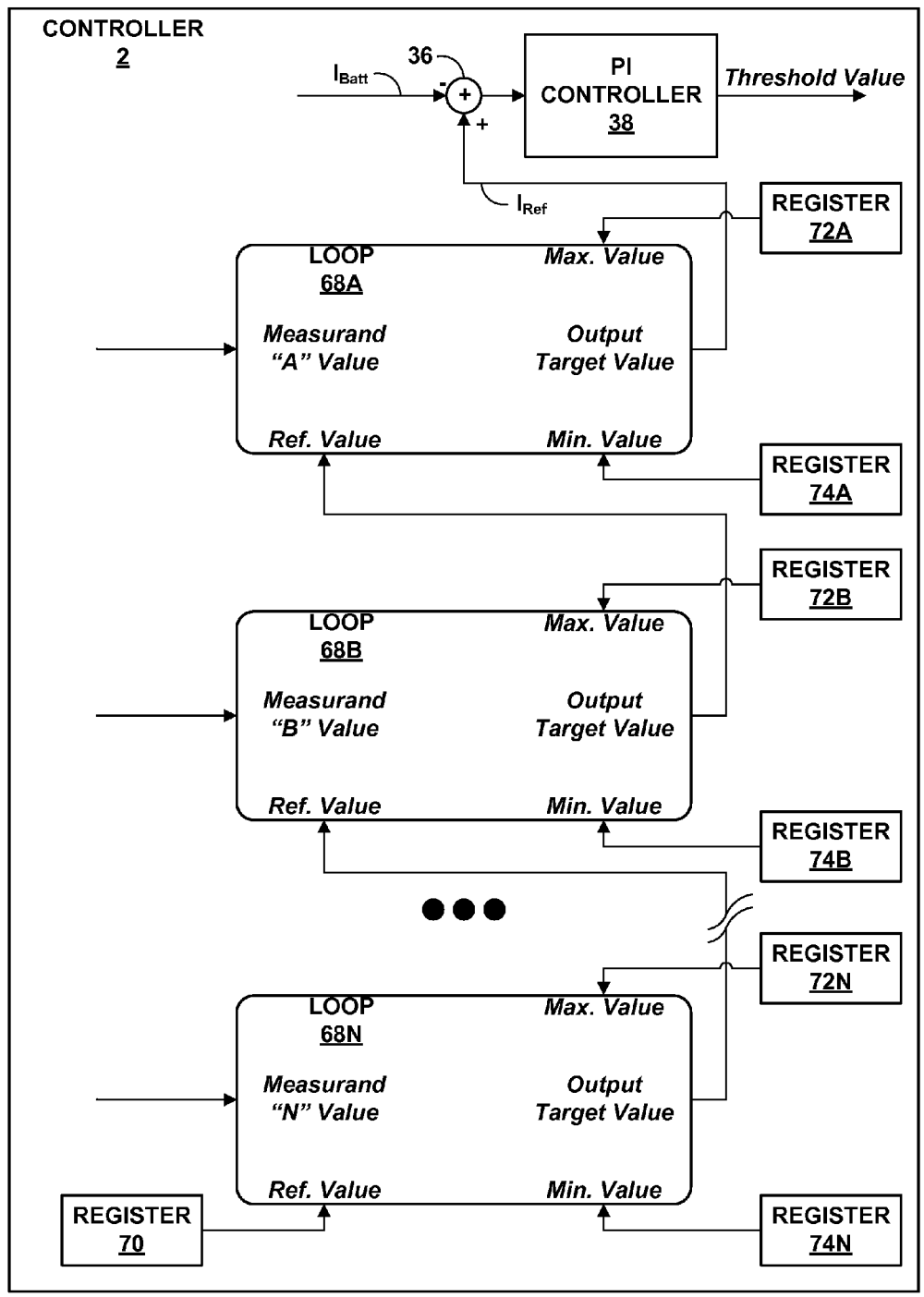
FIG. 6 is a block diagram illustrating details of an example controller that controls a switched mode power converter, in accordance with one or more techniques of this disclosure.

FIG. 6 is a block diagram illustrating details of an example controller that controls a switched mode power converter, in accordance with one or more techniques of this disclosure. As illustrated in the example of FIG. 6, controller 2 may include nested loops 68, a reference value register 70, a plurality of maximum value registers 72A-72N (collectively "maximum value registers 72"), minimum value registers 74, subtractor 36, and PI controller 38. The functionality of subtractor 36, and PI controller 38 is described above with reference to FIG. 4.

Nested loops 68 may include functionality similar to nested loops 68 of FIG. 5. In the example of FIG. 6, nested loops 68 may be arranged in a serial configuration. For instance, the output of the outer most loop may be used as the reference value for the next loop. As illustrated in the example of FIG. 6, the output target value determined by loop 68N may be the reference value used by loop 68B, the next inner loop, when determining the output target value of loop 68B. Further, the output target value determined by loop 68B may be the reference value used by loop 68A, the next inner loop, when determining the output target value of loop 68A.

Each of maximum value registers 72 include functionality similar to maximum value register 72 of FIG. 5. Reference value register 70 may include functionality similar to reference value register 70 of FIG. 5. Minimum value registers 74 may include functionality similar to reference value register 70 of FIG. 5.

In accordance with one or more techniques of this disclosure, loop 68N may be associated with a first measurand and may receive a first measurand value from another component of system 100 (e.g., a power converter, such as power converter 4 of FIGS. 1, 3, and 4, or a load, such as load 6 of FIGS. 1, 3, and 4), a reference value from reference value register 70, a minimum value from minimum value register 74N, and a maximum value from maximum value register 72N. Based on the received values, loop 68N may determine an output target value and provide the determined value to the next inner loop. As illustrated in FIG. 6, the next inner loop is loop 68B.

Loop 68B may be associated with a second measurand and may receive a second measurand value from another component of system 100 (e.g., a power converter, such as power converter 4 of FIGS. 1, 3, and 4, or a load, such as load 6 of FIGS. 1, 3, and 4), a reference value from loop 68N (i.e., the reference value of loop 68B is the determined output target value of loop 68N), a minimum value from minimum value register 74B, and a maximum value from maximum value register 72B. Based on the received values, loop 68B may determine an output target value and provide the determined value to the next inner loop. As illustrated in FIG. 6, the next inner loop is loop 68A.

Loop 68A may be associated with a third measurand and may receive a third measurand value from another component of system 100 (e.g., a power converter, such as power converter 4 of FIGS. 1, 3, and 4, or a load, such as load 6 of FIGS. 1, 3, and 4), a reference value from loop 68B (i.e., the reference value of loop 68A is the determined output target value of loop 68B), a minimum value from minimum value register 74A, and a maximum value from maximum value register 72A. Based on the received values, loop 68A may determine an output target value and provide the determined value to the next inner loop. As illustrated in FIG. 6, the current control loop (i.e., the determined output target value of loop 68A is the reference current used by the current control loop).

Figure 7:
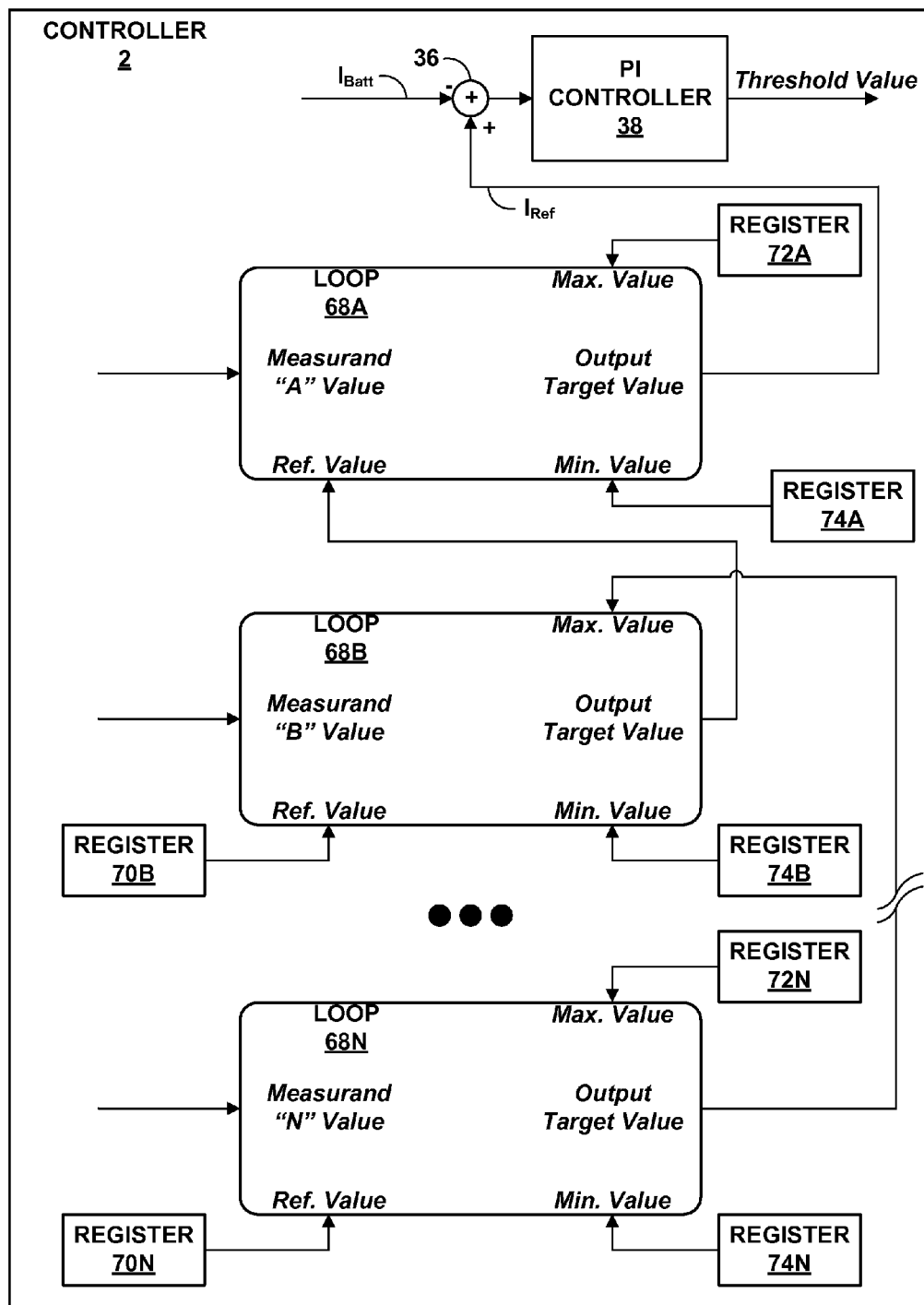
FIG. 7 is a block diagram illustrating details of an example controller that controls a switched mode power converter, in accordance with one or more techniques of this disclosure.

FIG. 7 is a block diagram illustrating details of an example controller that controls a switched mode power converter, in accordance with one or more techniques of this disclosure. As illustrated in the example of FIG. 7, controller 2 may include nested loops 68, reference value registers 70, maximum value registers 72, minimum value registers 74, subtractor 36, and PI controller 38. The functionality of subtractor 36, and PI controller 38 are described above with reference to FIG. 4.

Nested loops 68 may include functionality similar to nested loops 68 of FIGS. 5 and 6. In the example of FIG. 7, nested loops 68 may be arranged in a mixed serial and parallel configuration. For instance, the output of the outer most loop may be used as the maximum value for the next loop. As illustrated in the example of FIG. 7, the output target value determined by loop 68N may be the maximum value used by loop 68B, the next inner loop, when determining the output target value of loop 68B. Further, the output target value determined by loop 68B may be the reference value used by loop 68A, the next inner loop, when determining the output target value of loop 68A. In other words, in the example of FIG. 7, loop 68N is in parallel with loop 68B which is in series with loop 68A. In some examples, other combinations of parallel and serial loops are possible (e.g., loop 68N may be in series with loop 68B which may be in parallel with loop 68A).

In accordance with one or more techniques of this disclosure, loop 68N may be associated with a first measurand and may receive a first measurand value from another component of system 100 (e.g., a power converter, such as power converter 4 of FIGS. 1, 3, and 4, or a load, such as load 6 of FIGS. 1, 3, and 4), a reference value from reference value register 70N, a minimum value from minimum value register 74N, and a maximum value from maximum value register 72. Based on the received values, loop 68N may determine an output target value and provide the determined value to the next inner loop. As illustrated in FIG. 7, the next inner loop is loop 68B.

Loop 68B may be associated with a second measurand and may receive a second measurand value from another component of system 100 (e.g., a power converter, such as power converter 4 of FIGS. 1, 3, and 4, or a load, such as load 6 of FIGS. 1, 3, and 4), a reference value from reference value register 70B, a minimum value from minimum value register 74B, and a maximum value from loop 68N (i.e., the maximum value of loop 68B is the determined output target value of loop 68N). Based on the received values, loop 68B may determine an output target value and provide the determined value to the next inner loop. As illustrated in FIG. 7, the next inner loop is loop 68A.

Loop 68A may be associated with a third measurand and may receive a third measurand value from another component of system 100 (e.g., a power converter, such as power converter 4 of FIGS. 1, 3, and 4, or a load, such as load 6 of FIGS. 1, 3, and 4), a reference value from loop 68B (i.e., the reference value of loop 68A is the determined output target value of loop 68B), a minimum value from minimum value register 74A, and a maximum value from maximum value register 72A. Based on the received values, loop 68A may determine an output target value and provide the determined value to the next inner loop. As illustrated in FIG. 7, the current control loop (i.e., the determined output target value of loop 68A is the reference current used by the current control loop).

Figure 8:
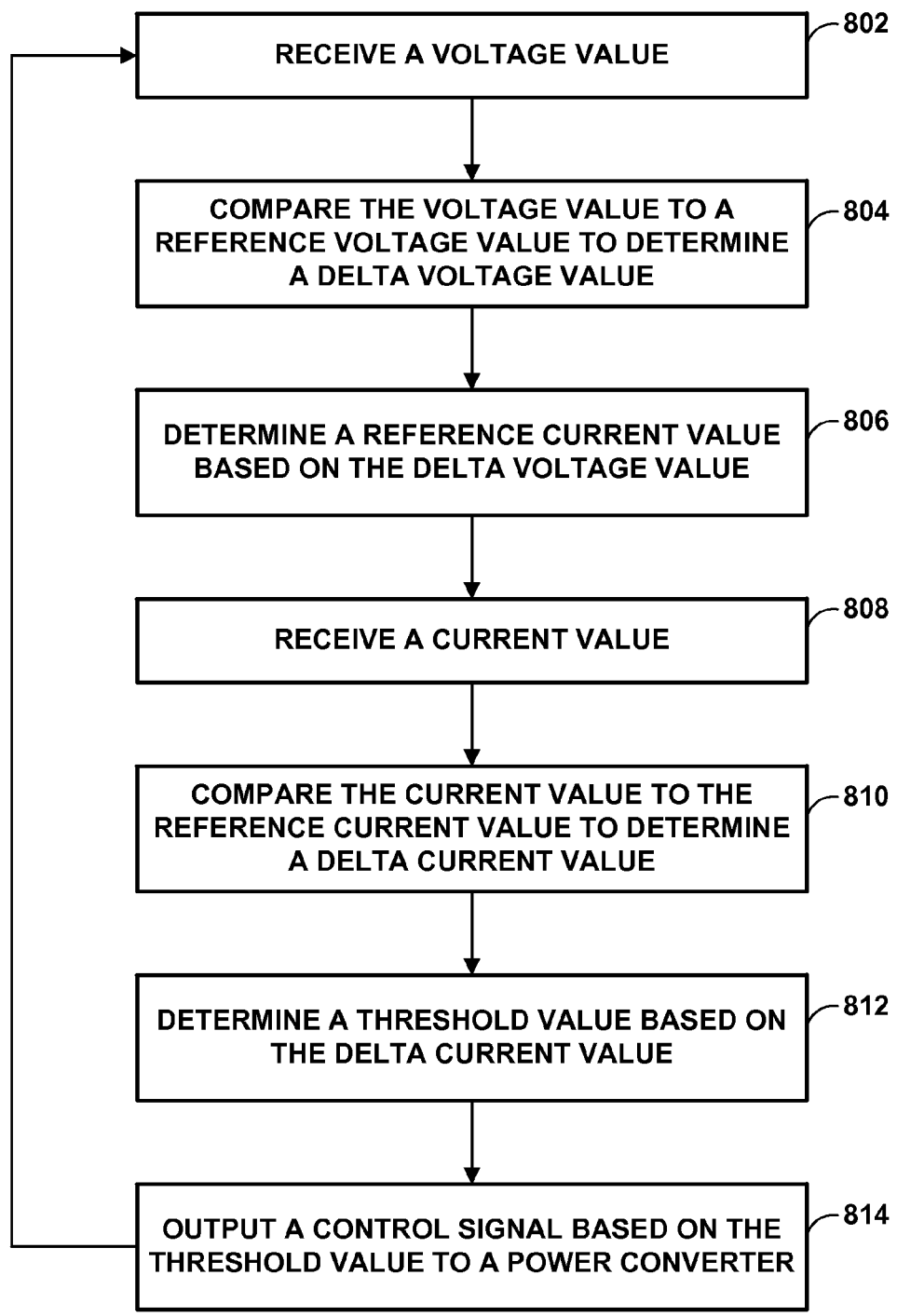
FIG. 8 is a flowchart illustrating example operations of a controller for a switched mode power converter in accordance with one or more techniques of this disclosure.

FIG. 8 is a flowchart illustrating example operations of a controller for a switched mode power converter in accordance with one or more techniques of this disclosure. For purposes of illustration only, the example operations are described below within the context of controller 2, as shown in FIGS. 1-4.

In the example of FIG. 8, controller 2 may initially receive a voltage value (802). Controller 2 may subsequently compare the voltage value to a reference voltage value to determine a delta voltage value (804). Controller 2 may then determine a reference current value based on the delta voltage value (806). Controller 2 may receive a current value (808). Controller 2 may subsequently compare the current value to the reference current value to determine a delta current value (810). Controller 2 may then determine a threshold value based on the delta current value (812). Controller 2 may then output a control signal based on the threshold value to a power converter (814).

In one example, the voltage value may correspond to a voltage across a load electrically coupled to an output of the power converter. In one example, the current value may correspond to a current flowing to the load. In one example the load may include at least one of a battery and a device. In one example, the battery may include a plurality of cells. In one example, receiving a voltage value from the power converter may include receiving a plurality of voltage values from the power converter. In one example, the plurality of voltage values may respectively correspond to voltages across the plurality of cells of the battery. In one example, the operations include selecting a voltage value from the plurality of voltage values. In one example, comparing the voltage value to the reference voltage value to determine the delta voltage value may include comparing the selected voltage value to the reference voltage to determine the delta voltage value. In some examples, selecting the voltage value from the plurality of voltage values may include selecting the greatest voltage value from the plurality of voltage values.

In one example, determining the reference current value based on the delta voltage value may include applying a non-linear gain to the delta voltage value. In one example, applying the non-linear gain to the delta voltage value may include applying a first gain level to the delta voltage value where the delta voltage value is greater than the reference voltage value and applying a second gain level to the delta voltage value where the delta voltage value is less than a second threshold value. In some examples, the first gain level may be greater than the second gain level. In some examples, the second threshold value may be zero.

In one example, determining the reference current value based on the delta voltage value may include integrating the delta voltage value to determine the reference current value. In one example, the operations include restricting the reference current value such that the reference current value is greater than a minimum value and lesser than a maximum value. In one example, the minimum value may be an end of charge current level and the maximum value may be a maximum current at which a battery electrically coupled to an output of the power converter can be charged.

In one example, receiving the current value may include receiving an analog current sample, and converting the analog current sample into a digital current value. In one example, comparing the current value to the reference current value to determine a delta current value may include comparing the digital current value to the reference current value to determine a delta current value. In one example, receiving the voltage value from the power converter may include receiving an analog voltage sample, and converting the analog voltage sample into a digital voltage value. In one example, comparing the voltage value to the reference voltage to determine the delta voltage value may include comparing the digital voltage value to the reference voltage to determine the delta voltage value.

In one example, comparing the current value to the reference current value to determine the delta current value may include subtracting the reference current value from the current value to determine the delta current value. In one example, determining the threshold value based on the delta current value may include determining the threshold value based on the delta current value with a proportional-integral (PI) controller.

In one example, the control signal may be a pulse-width modulated (PWM) signal. In one example, the operations include generating the PWM signal based on the threshold value, and outputting the PWM signal to the power converter. In one example, determining the reference current value based on the delta voltage value may include determining the reference current value based the delta voltage value and at least one of an input current of the power converter and a temperature of a battery electrically coupled to an output of the power converter. In one example, the power converter is a multi-phase power converter.

Example 1

A method comprising: receiving a voltage value; comparing the voltage value to a reference voltage value to determine a delta voltage value; determining a reference current value based on the delta voltage value; receiving a current value; comparing the current value to the reference current value to determine a delta current value; and determining a threshold value based on the delta current value, wherein the threshold value is used to define a control signal that controls a power converter.

Example 2

The method of example 1, wherein the voltage value corresponds to a voltage across a load electrically coupled to an output of the power converter, wherein the current value corresponds to a current flowing to the load, and wherein the load comprises at least one of a battery and a device.

Example 3

The method of any combination of examples 1-2, wherein the battery comprises a plurality of cells, wherein receiving a voltage value comprises receiving a plurality of voltage values, and wherein the plurality of voltage values respectively correspond to voltages across the plurality of cells of the battery, further comprising: selecting a voltage value from the plurality of voltage values, wherein comparing the voltage value to the reference voltage value to determine the delta voltage value comprises comparing the selected voltage value to the reference voltage to determine the delta voltage value.

Example 4

The method of any combination of examples 1-3, wherein selecting the voltage value from the plurality of voltage values comprises selecting the greatest voltage value from the plurality of voltage values.

Example 5

The method of any combination of examples 1-4, wherein determining the reference current value based on the delta voltage value comprises applying a non-linear gain to the delta voltage value.

Example 6

The method of any combination of examples 1-5, wherein the threshold value is a first threshold value, and wherein applying the non-linear gain to the delta voltage value comprises applying a first gain level to the delta voltage value where the delta voltage value is greater than a second threshold value and applying a second gain level to the delta voltage value where the delta voltage value is less than the second threshold value.

Example 7

The method of any combination of examples 1-6, wherein the first gain level is greater than the second gain level.

Example 8

The method of any combination of examples 1-7, wherein the second threshold value is the reference voltage value.

Example 9

The method of any combination of examples 1-8, wherein determining the reference current value based on the delta voltage value comprises integrating the delta voltage value to determine the reference current value.

Example 10

The method of any combination of examples 1-9, further comprising restricting the reference current value such that the reference current value is greater than a minimum value and lesser than a maximum value, wherein the minimum value is an end of charge current level and the maximum value is a maximum current at which a battery electrically coupled to an output of the power converter can be charged.

Example 11

The method of any combination of examples 1-10, wherein receiving the current value comprises: receiving an analog current sample; and converting the analog current sample into a digital current value, wherein comparing the current value to the reference current value to determine a delta current value comprises comparing the digital current value to the reference current value to determine a delta current value, and wherein receiving the voltage value from the power converter comprises: receiving an analog voltage sample; and converting the analog voltage sample into a digital voltage value, wherein comparing the voltage value to the reference voltage to determine the delta voltage value comprises comparing the digital voltage value to the reference voltage to determine the delta voltage value.

Example 12

The method of any combination of examples 1-11, wherein comparing the current value to the reference current value to determine the delta current value comprises subtracting the reference current value from the current value to determine the delta current value.

Example 13

The method of any combination of examples 1-12, wherein determining the threshold value based on the delta current value comprises determining the threshold value based on the delta current value with a proportional-integral (PI) controller.

Example 14

The method of any combination of examples 1-13, wherein the control signal is a pulse-width modulated (PWM) signal, further comprising: generating the PWM signal based on the threshold value; and outputting the PWM signal to the power converter.

Example 15

The method of any combination of examples 1-14, wherein determining the reference current value based on the delta voltage value further comprises determining the reference current value based on the delta voltage value and at least one of an input current of the power converter, a temperature of a battery electrically coupled to an output of the power converter, and a state of charge of the battery.

Example 16

The method of any combination of examples 1-15, further comprising: determining the reference voltage value based on at least one of an input current of the power converter, a temperature of a battery electrically coupled to an output of the power converter, and a state of charge of the battery.

Example 17

The method of any combination of examples 1-16, further comprising: determining a minimum value based on at least one of an input current of the power converter, a temperature of a battery electrically coupled to an output of the power converter, and a state of charge of the battery; and restricting the reference current value such that the reference current value is greater than the minimum value and lesser than a maximum value.

Example 18

The method of any combination of examples 1-17, wherein the power converter is a multi-phase power converter.

Example 19

A circuit comprising: a first analog to digital converter configured to convert an analog voltage sample into a digital voltage value; a first subtractor configured to subtract a reference voltage from the digital voltage value to determine a delta voltage value; an integrator configured to integrate the delta voltage value to determine a reference current value; a second analog to digital converter configured to convert an analog current sample received from the power converter into a digital current value; a second subtractor configured to subtract the reference current value from the digital current value to determine a delta current value; a controller configured to determine a threshold value based on the delta current value; and a digital pulse width modulator configured to output, to a power converter, a control signal based on the threshold value.

Example 20

The circuit of example 19, wherein the voltage value corresponds to a voltage across a load electrically coupled to an output of the power converter, wherein the current value corresponds to a current flowing through the load, wherein the load comprises a battery, wherein the battery comprises a plurality of cells, wherein the first analog to digital converter is configured to convert a plurality of analog voltage samples received from the power converter into a plurality of digital voltage values, wherein the plurality of voltage values respectively correspond to voltages across the plurality of cells of the battery, the circuit further comprising: a selector configured to select a cell voltage value from the plurality of digital voltage values, wherein the first subtractor is configured to subtract the reference voltage from the selected cell voltage value to determine the delta voltage value.

Example 21

The circuit of any combination of examples 19-20, further comprising: an amplifier configured to apply a non-linear gain to the delta voltage value to determine an amplified delta voltage value, wherein the integrator is configured to integrate the amplified delta voltage value to determine the reference current value.

Example 22

The circuit of any combination of examples 19-21, further comprising components that define at least one of: an input current loop, wherein the components comprise: a third subtractor configured to subtract a reference input current from an input current value received from the power converter to determine a delta input current value; and a second integrator configured to integrate the delta input current value to determine a first intermediate value; and a temperature loop, wherein the components comprise: a fourth subtractor configured to subtract a reference temperature from a temperature value received from the power converter to determine a delta temperature value; and a third integrator configured to integrate the delta temperature value to determine a second intermediate value; a state of charge loop, wherein the components comprise: a fifth subtractor configured to subtract a reference state of charge from a state of charge value received from the power converter to determine a delta state of charge value; and a fourth integrator configured to integrate the delta state of charge value to determine a third intermediate value, wherein the integrator is a clamped integrator configured to determine the reference current value between a minimum value and a maximum value, wherein the maximum value is based on one or more of the first intermediate value, the second intermediate value, and the third intermediate value.

Example 23

The circuit of any combination of examples 18-25, wherein the state of charge loop is an outer loop.

Example 24

A device comprising: means for receiving a voltage value; means for comparing the voltage value to a reference voltage value to determine a delta voltage value; means for determining a reference current value based on the delta voltage value; means for receiving a current value; means for comparing the current value to the reference current value to determine a delta current value; and means for determining a threshold value based on the delta current value, wherein the threshold value is used to define a control signal that controls a power converter.

Example 25

A device comprising means for performing any combination of the methods of examples 1-18.

Example 26

A circuit comprising means for performing any combination of the methods of examples 1-18.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   receiving a voltage value that corresponds to a voltage across a load electrically coupled to an output of a power converter during a first time period;
   comparing the voltage value to a reference voltage value to determine a delta voltage value;
   determining a reference current value based on the delta voltage value;
   receiving a current value that corresponds to a current flowing to the load during the first time period;
   comparing the current value to the reference current value to determine a delta current value; and
   determining a threshold value based on the delta current value, wherein the threshold value is used to define a control signal that controls the power converter during a second time period that is different than the first time period.

2. The method of claim 1, wherein the load comprises at least one of a battery and a device.

3. The method of claim 2, wherein the battery comprises a plurality of cells, wherein receiving a voltage value comprises receiving a plurality of voltage values, and wherein the plurality of voltage values respectively correspond to voltages across the plurality of cells of the battery, further comprising:
   selecting a voltage value from the plurality of voltage values, wherein comparing the voltage value to the reference voltage value to determine the delta voltage value comprises comparing the selected voltage value to the reference voltage to determine the delta voltage value.

4. The method of claim 3, wherein selecting the voltage value from the plurality of voltage values comprises selecting the greatest voltage value from the plurality of voltage values.

5. The method of claim 1, wherein determining the reference current value based on the delta voltage value comprises applying a non-linear gain to the delta voltage value.

6. The method of claim 5, wherein the threshold value is a first threshold value, and wherein applying the non-linear gain to the delta voltage value comprises applying a first gain level to the delta voltage value where the delta voltage value is greater than a second threshold value and applying a second gain level to the delta voltage value where the delta voltage value is less than the second threshold value.

7. The method of claim 6, wherein the first gain level is greater than the second gain level.

8. The method of claim 6, wherein the second threshold value is zero.

9. The method of claim 1, wherein determining the reference current value based on the delta voltage value comprises integrating the delta voltage value to determine the reference current value.

10. The method of claim 1, further comprising restricting the reference current value such that the reference current value is greater than a minimum value and lesser than a maximum value, wherein the minimum value is an end of charge current level and the maximum value is a maximum current at which a battery electrically coupled to an output of the power converter can be charged.

11. The method of claim 1, wherein receiving the current value comprises:
   receiving an analog current sample; and
   converting the analog current sample into a digital current value, wherein comparing the current value to the reference current value to determine a delta current value comprises comparing the digital current value to the reference current value to determine a delta current value, and wherein receiving the voltage value from the power converter comprises:
   receiving an analog voltage sample; and
   converting the analog voltage sample into a digital voltage value, wherein comparing the voltage value to the reference voltage to determine the delta voltage value comprises comparing the digital voltage value to the reference voltage to determine the delta voltage value.

12. The method of claim 1, wherein comparing the current value to the reference current value to determine the delta current value comprises subtracting the reference current value from the current value to determine the delta current value.

13. The method of claim 1, wherein determining the threshold value based on the delta current value comprises determining the threshold value based on the delta current value with a proportional-integral (PI) controller.

14. The method of claim 1, wherein the control signal is a pulse-width modulated (PWM) signal, further comprising:
   generating the PWM signal based on the threshold value; and
   outputting the PWM signal to the power converter.

15. The method of claim 1, wherein determining the reference current value based on the delta voltage value further comprises determining the reference current value based on the delta voltage value and at least one of an input current of the power converter and a temperature of a battery electrically coupled to an output of the power converter.

16. The method of claim 1, further comprising:
   determining the reference voltage value based on at least one of an input current of the power converter, a temperature of a battery electrically coupled to an output of the power converter, and a state of charge of the battery.

17. The method of claim 1, further comprising:
determining a minimum value based on at least one of an input current of the power converter, a temperature of a battery electrically coupled to an output of the power converter, and a state of charge of the battery; and
restricting the reference current value such that the reference current value is greater than the minimum value and lesser than a maximum value.

18. The method of claim 1, wherein the power converter is a multi-phase power converter.

19. A circuit comprising:
a first analog to digital converter configured to convert an analog voltage sample into a digital voltage value;
a first subtractor configured to subtract a reference voltage from the digital voltage value to determine a delta voltage value;
an integrator configured to integrate the delta voltage value to determine a reference current value;
a second analog to digital converter configured to convert an analog current sample received from the power converter into a digital current value;
a second subtractor configured to subtract the reference current value from the digital current value to determine a delta current value;
a controller configured to determine a threshold value based on the delta current value; and
a digital pulse width modulator configured to output, to a power converter, a control signal based on the threshold value.

20. The circuit of claim 19,
wherein the voltage value corresponds to a voltage across a load electrically coupled to an output of the power converter,
wherein the current value corresponds to a current flowing through the load,
wherein the load comprises a battery,
wherein the battery comprises a plurality of cells,
wherein the first analog to digital converter is configured to convert a plurality of analog voltage samples received from the power converter into a plurality of digital voltage values,
wherein the plurality of voltage values respectively correspond to voltages across the plurality of cells of the battery,
the circuit further comprising:
a selector configured to select a cell voltage value from the plurality of digital voltage values,
wherein the first subtractor is configured to subtract the reference voltage from the selected cell voltage value to determine the delta voltage value.

21. The circuit of claim 19, further comprising:
an amplifier configured to apply a non-linear gain to the delta voltage value to determine an amplified delta voltage value, wherein the integrator is configured to integrate the amplified delta voltage value to determine the reference current value.

22. The circuit of claim 19, further comprising components that define at least one of:
an input current loop, wherein the components comprise:
a third subtractor configured to subtract a reference input current from an input current value received from the power converter to determine a delta input current value; and
a second integrator configured to integrate the delta input current value to determine a first intermediate value;
a temperature loop, wherein the components comprise:
a fourth subtractor configured to subtract a reference temperature from a temperature value received from the power converter to determine a delta temperature value; and
a third integrator configured to integrate the delta temperature value to determine a second intermediate value;
a state of charge loop, wherein the components comprise:
a fifth subtractor configured to subtract a reference state of charge from a state of charge value received from the power converter to determine a delta state of charge value; and
a fourth integrator configured to integrate the delta state of charge value to determine a third intermediate value,
wherein the integrator is a clamped integrator configured to determine the reference current value between a minimum value and a maximum value, wherein the maximum value is based on one or more of the first intermediate value, the second intermediate value, and the third intermediate value.

23. A device comprising:
means for receiving a voltage value that corresponds to a voltage across a load electrically coupled to an output of a power converter during a first time period;
means for comparing the voltage value to a reference voltage value to determine a delta voltage value;
means for determining a reference current value based on the delta voltage value;
means for receiving a current value that corresponds to a current flowing to the load during the first time period;
means for comparing the current value to the reference current value to determine a delta current value; and
means for determining a threshold value based on the delta current value, wherein the threshold value is used to define a control signal that controls the power converter during a second time period that is different than the first time period.

* * * * *